(12) United States Patent
Hertlein

(10) Patent No.: US 9,510,519 B2
(45) Date of Patent: Dec. 6, 2016

(54) TELESCOPING PLANT SUPPORT WITH SIZE-ADJUSTABLE SUPPORT BASE

(76) Inventor: Kay Lynn Hertlein, Kalispell, MT (US)

(*) Notice: Subject to any disclaimer, the term of this patent is extended or adjusted under 35 U.S.C. 154(b) by 13 days.

(21) Appl. No.: 12/500,013

(22) Filed: Jul. 9, 2009

(65) Prior Publication Data
US 2009/0320359 A1    Dec. 31, 2009

Related U.S. Application Data

(63) Continuation-in-part of application No. 11/250,108, filed on Oct. 13, 2005, now abandoned.

(51) Int. Cl.
*A01G 17/06*    (2006.01)
*A01G 9/12*     (2006.01)

(52) U.S. Cl.
CPC .............. *A01G 9/122* (2013.01); *A01G 9/124* (2013.01)

(58) Field of Classification Search
CPC ........... A01G 9/122; A01G 9/124; A01G 9/12
USPC ........... 47/65.5, 66.1, 47, 44, 83, 86, 43, 42, 45,47/46; 248/346.07, 188.5, 188.1, 910, 159
IPC ..................................................... A01G 09/12
See application file for complete search history.

(56) References Cited

U.S. PATENT DOCUMENTS

| | | | | |
|---|---|---|---|---|
| 3,000,074 A * | 9/1961 | Butkiewicz | ...................... | 28/147 |
| 3,165,863 A * | 1/1965 | Duran | ................ | 47/47 |
| 5,425,203 A * | 6/1995 | Scott | ................. | 47/70 |
| D363,652 S * | 10/1995 | Turner | ................ | D8/1 |
| 5,454,189 A * | 10/1995 | Graham et al. | ............... | 47/41.12 |
| 5,501,038 A * | 3/1996 | Gregoranto | ....................... | 47/70 |
| 6,029,396 A * | 2/2000 | Gillingham | ....................... | 47/39 |
| 6,457,276 B1 * | 10/2002 | Masters | ....................... | 47/41.01 |
| 6,702,239 B2 * | 3/2004 | Boucher | ....................... | 248/156 |
| 7,377,073 B2 * | 5/2008 | Grunnah | ........................... | 47/47 |

FOREIGN PATENT DOCUMENTS

FR   2611427 A1 *  9/1988  ............... A01G 9/12
GB   2191673 A  * 12/1987  ............... A01G 9/12

* cited by examiner

*Primary Examiner* — Kristen C Hayes
(74) *Attorney, Agent, or Firm* — Patricia M. Costanzo

(57) ABSTRACT

A plant support effective in pots with a base diameter of from about 4 to 24 inches, constructed of a telescoping pole; a central perimeter size-adjustable base effectively supporting the pole; at least a first detachable ring disc detachably attachable about the base, and at least a second ring disc detachably attachable about the first ring disc, providing for effective support for growing plants. The telescoping pole is length adjustable to at least eight feet to eliminate the need to replace a support as the plant grows. The plant support is constructed so as to be removed from a pot together as one with the plant it is supporting avoiding separating the plant from the plant support device as the base of the plant support device supports the root mass allowing much of the soil to remain around the root mass as the plant is lifted from its pot.

1 Claim, 7 Drawing Sheets

TELESCOPING PLANT SUPPORT WITH SIZE-ADJUSTABLE SUPPORT BASE

CROSS-REFERENCE TO RELATED APPLICATIONS

This application claims benefit from application Ser. No. 11/250,108 filed Oct. 13, 2005.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to a support for a plant and, more particularly, to a plant supporting device having a telescoping plant support pole that easily adjusts to the height increase of a growing plant and a base part from which the telescoping plant support pole part emanates, which base part can be made either larger or smaller to adjust to the size of the pot.

The background information discussed below is presented to better illustrate the novelty and usefulness of the present invention. This background information is not admitted prior art.

Historically, plant supports are made from canes, such as bamboo canes, and are relied upon to support saplings, vines, flowering plants, and others. Plant supports are required for several reasons. One reason is when a growing plant's stem height increases faster than either the stem's width or the plant's root mass, so that the stem is not strong enough to prevent it from bending in an undesirable manner. Support for potted plants also is required when their growing environments become crowded, such as when a plant starts to outgrow its container. When a plant is kept in a container that is too small for it, the plant's roots are prevented from extending to their natural depth and width, which reduces the plants ability to support itself. Plant supports are needed when a plant becomes top heavy, such as when a plant is in full bloom or is bearing fruit. Plant supports are also required when plants are potted in a light soil, such as soils that are mixtures of sand, peat moss, vermiculite, and perlite. These soil amendments are used to keep the soil loose and aerated, however such a loose soil cannot provide sturdy support for the plant growing in the soil. Moreover, standard-sized flower pots are limited in depth, often providing insufficient amount of support for some plants, especially for plants that are top heavy due to a large quantity of leaves, fruits, or flowers and, hence, need additional support. In all of these cases, a plant support is needed to support the plant.

SUMMARY

The present Inventor recognized that when she provides a young, short stemmed plant with a comparably sized support, it is not able to provide support to the plant as it grows and must be replaced with a longer cane, periodically. In addition, growing plant roots commonly adhere to the support cane, so that when the support cane is removed the roots are disturbed and/or damaged. Moreover, when a new, longer cane is inserted into the soil, there is no way to avoid damaging existing plants.

Plants frequently outgrow their pot in only a few months, especially during the spring season, requiring the plant to be transplanted to a larger pot. When a plant is transplanted, it typically should be transplanted to a pot one size larger. Pot sizes are given by the diameter of the pot about its upper edge, thus a plant that has outgrown its 10 inch pot should be transplanted to a 12 inch pot. This means that each time a growing plant is transplanted to a larger pot the height of the plant increases, the root mass increases, the height of the pot increases, and the width of the base of the pot increases. Thus, it became evident to the Inventor that not only does the height of the plant support need to be taken into account as a plant grows, but that the plant support pole should be held securely in the pot by a base to which the support is attached and that the size of the base should also be taken into account. A perimeter size-adjustable base to which a cane (pole) is securely attached would provide support for the cane especially when the base is held firmly beneath the soil. Right after transplanting, a plant is somewhat unstable until the roots grow into the soil of the new pot. Thus, a newly transplanted plant requires a plant support, and moreover the plant support and its base should be of an appropriate size for the pot. Similarly, whenever plants are taken outdoors for the summer or indoors for the winter, they generally require some support. There are times, however, when a plant will require a smaller pot and a support of smaller size. For example, when a plant becomes too large for the pot it is in, the plant is divided into several smaller plants that are then each repotted in a smaller pot and smaller sized plant supports. As an avid gardener, Inventor realized that a plant support pole whose height may be conveniently adjusted to keep pace with the increasing height of the plant would be useful to eliminate the need to replace the pole as a plant grows.

There have been several attempts to provide a plant support device that solves the above mentioned problems. However, in those supports that include a pole-supporting base, the base cannot be adjusted to accommodate differently sized pots, causing a consumer to purchase several differently sized supports, assuming that a variety of sizes are available.

Accordingly, Inventor designed and made plant supports having a telescoping support pole and a pole-supporting base. The height of the support pole may be easily and readily increased and decreased without the need to remove the plant or the plant support from the pot and does not requiring additional parts or tools in order to make the adjustment. The perimeter of the support pole base may also be size-adjusted to accommodate various sized pots so that the plant support device may be used and reused in pots of various sizes.

The plant support according to the principles of the present invention constitutes a plant support pole that is securely, detachably attached to a pole-support base part having a perimeter that is size-adjustable. The plant support telescoping pole part may be telescoped upwards to accommodate plants at various stages of their growth. The height adjustments may be made without any need for removing the plant or the plant support device from the pot.

It should be realized that when the plant stem grows faster than its root mass, the plant does not have to be repotted, but the height of the pole support does have to be increased. The telescoping pole satisfies this need. In fact, in one favored embodiment, the telescoping pole may be fully extended to reach an eight foot height. When both the stem and the root mass grow, the plant soon becomes root bound and at this time the plant must be transplanted to a larger pot. Another benefit of a plant support device made according to the principles of the present invention is that the plant and its plant support device may be removed from the outgrown without having to separate the plant from the plant support device. The base of the plant support device supports the root mass allowing much of the soil to stay in place around the root mass as the plant is lifted from one pot to be placed into another. If required, or desired, before the plant is positioned within a larger pot, the perimeter of the base may be easily and rapidly increased by adding one or more additional base rings to the current base. If the plant is being divided into a plurality of smaller plants each to be potted into a smaller pot, the size of the base may be reduced by removing one or more rings. As described above, as the plant stem grows, the length of the support pole may be increased (or decreased) as needed even if plant roots grow securely around and to the support pole and the base.

In one embodiment of the invention, the bottom section of the bottom segment of the pole support is affixed to the base by screwing a threaded end of the pole into a threaded receiving aperture in the base. The receiving aperture of the base may be situated in the center of the base, or alternatively if desired, it may be center off to one side of the base. As mentioned above, the plant support device made according to the principles of the present invention may be used in a variety of pot sizes because the base, which has variously sized segments that may be removed or added to the base. To use the growing plant support, the perimeter size-adjustable base with the support pole detachably attached is placed in the bottom of an otherwise empty flower pot. Potting medium, such as soil and a plant are then added to the pot to cover and, thus, secure the plant support device in place.

In one embodiment, the perimeter size-adjustable base of the plant support device comprises a series of sized ring-like discs or rings, with each ring sized to fit about an adjacent inner disc or ring and within an adjacent outer disc or ring, until the outermost or inner most ring is reached. The inner most ring comprises an aperture in the central pole-supporting disc for receiving the larger diameter end of the telescoping pole base to provide support for the pole and to provide support for the root system, especially when a plant and the support device about which it is growing are removed from a pot for repotting. The central pole-supporting disc is sized to fit within a second, outer disc having a ring-like disc or ring structure. The second disc or ring has an inner diameter that is large enough to fit about the outer diameter of the central disc support base. In addition, there is at least one additional disc or ring, with an inner diameter sized to fit about the outer diameter of the second ring-like disc.

In a preferred embodiment, each of the successively larger ring-like discs are reversibly detachable and attachable to and from the central pole-supporting disc providing for the plant support to be used with increasingly larger and smaller plant pots.

The tab connectors are easy to use. No tools or specials skills are required for the attachment or detachment of the successively larger or smaller ring discs. In one preferred embodiment, the attachment/detachment snap tab system comprises at least one snap fitting per tab end per ring. The central pole-support is fitted with at least one snap part and each ring is fitted with at least one second snap part. Thus the tabs may easily be removed from or placed on the rings and/or disc by simply snapping or unsnapping the relevant snap tab. The means of attaching one ring to another and to the central disc may vary as desired. For example, instead of having snaps, slit-like apertures may be provided in the rings and central perimeter size-adjustable base for receiving aperture fitting tab ends. It is to be understood that the snap tab and the slit/tab attachment/detachment structure are only two ways of attaching and detaching the base sections to and from each other. Detachable attachment means and methods are numerous and well known in the art and need not be discussed further here. All of these, and others yet to be known, are contemplated for use by the invention.

In another embodiment, one where the base is manufactured as a single disc and then is scored or perforated along circular lines defining the inner and outer circumferences of a series of ringing discs, where the ring discs, like the rings discussed above, are sized so that each ring is larger than the ring preceding it from the central base disc outward. In this embodiment, the support base is made to fit smaller flower pots by detaching one or more of the ring base parts. This is accomplished by breaking the connection between an inner ring and the adjacent outer ring along a perforated separation line. In one preferred embodiment, the plant support may be sized down only to fit smaller pots as no way of reattaching the discs is provided.

Another preferred embodiment may be sized to fit both smaller and larger pots by simply returning the removed ring to its position about the next smaller size base part and where the reaffixed ring is held in place by frictional force between it and its neighbor ring. Another alternative is to have the ring discs attach and detach using sliding groove and ridge attachment means. These attachment means, and many others, are well-known in the art and need not be discussed any further herein.

In order to decrease the size of the plant support base having a total of three detachably attached consecutively sized ring disc parts, the user first removes the outer most ring disc from the next inner ring disc. The user may further reduce the size of the plant support base by removing the next disc from the central base support disc. Reducing the size of the plant support base allows a user to purchase a plant stand with a given base size that may be made smaller to fit smaller pots. In addition, the ring system used in this invention allows for the plant support base to be adjustable to nearly the precise size needed for a particular pot. Because the size may be adjusted in increments, users will enjoy the advantage of always having a plant support base that fits securely and snugly in a pot no matter what the size of the flower pot.

Where the plant support base has initially been reduced in size in order to fit a smaller pot, the plant support may subsequently be adjusted to a larger size to accommodate a growing plant's need for a larger sized pot. To increase the size of the plant support base, the user first attaches a ring disc about the central support disc. The ring disc is pre-sized to fit about the central base part and is attached to the central base part via a connector made for such detachable attachment, such as fitting a tab into a slit type aperture. The plant support base may be made even larger by attaching a third ring disc sized to fit about the second disc. This system is very user friendly and allows for size adjustments in small increments.

It should be noted that the invention may encompass a variety of forms. The plant support base may be made from a variety of different materials, including plastic, metal, and wood. In addition, the number of ring discs or rings that may be added to the plant support base is unlimited. In addition, the width of the rings may differ depending on the needs of the user. Allowing for an unlimited number of rings and varying widths of the rings will allow the user maximum flexibility altering the size of their plant support base. Furthermore, the shape of the rings and of the plant support pole may be dictated by the needs and the tastes of a user.

The present invention makes available all of the above described features by providing for a plant support consisting of a telescoping pole detachably attached to a perimeter size-adjustable base so arranged as to provide an effective amount of support for the stems and root mass of growing plants growing in plant pots wherein the perimeter of the perimeter size-adjustable base may be made smaller and/or larger to effectively support plants in smaller and larger sized pots, respectively wherein the base is constructed so as to have its perimeter size-adjusted to effectively support plants in pots having a base diameter of from about 4 to 24 inches.

Furthermore, the perimeter size-adjustable base further comprises:

a central perimeter size-adjustable base constructed so as to effectively support the telescoping pole means;

at least one first ring-like disc adapted for detachable attachment about the central section of perimeter size-adjustable base, at least one second ring adapted for detachable attachment about the first ring-like disc, wherein each of the ring-like discs are detachable from the rings about which they are attached, therein providing for the perimeter size-adjustable base to be used with increasingly smaller and larger plant pots.

Yet still, the at least first ring-like disc is detachably attachable to the central perimeter size-adjustable base by at least one disconnectable connector tab, and the at least second ring-like disc detachably attachable to the at least second ring-like disc by at least one disconnectable connector tab.

If desired, the at least one disconnectable connector tab end is fitted with a snap-able connector, the central perimeter size-adjustable base is fitted with a complementary snap-able connector for the disconnectable connection of the at least first ring using the at least one disconnectable connector tab, the at least first ring is fitted with a complementary snap-able connector for the disconnectable connection of the at least second ring, the at least second ring is fitted with a complementary snap-able connector for the disconnectable connection of an at least third ring.

Alternatively, the at least one connector tab is disconnectable connectable to the central base and to each of the rings via at least one slit in the base and in each of the rings, the slit adapted for effectively receiving and connecting with an aperture fitting connector tab end.

Moreover, the telescoping pole can be length adjusted to effectively support a growing plant of up to at least eight feet in height as the telescoping pole can be length adjusted to extend to at least eight feet.

The plant support may be constructed as a molded device, and, thus can be manufactured from a plastic or a metal, or if desired, can be made from a wood.

The at least a first ring-like disc may have a ring-like structure with inner and outer perimeter diameters sized for being attachable to and detachable from the central perimeter size-adjustable base;

at least a second ring-like disc having a ring-like structure with inner and outer diameters sized for being attachable to and detachable from the first ring-like disc, and wherein each of the ring-like discs are attachable to and detachable from the ring-like disc each is sized to be detachably attached to, therein providing for the plant support to effectively support growing plants potted in with increasingly larger and/or smaller plant pots, where the at least a first ring-like disc fixed to the central perimeter size-adjustable base by at least one reversibly attachable connector tab, and the at least a second ring-like disc fixed to the at least a first ring disc by at least one reversibly attachable connector tab.

The telescoping pole is conveniently length adjustable to effectively support a plant so as to eliminate the need to replace a support pole as the plant grows. wherein the plant support is constructed so as to be removed from a pot together as one with the plant it is supporting and that is to be repotted so as to avoid having to separate the plant from the plant support device as the base of the plant support device supports the root mass so as to allow much of the soil to stay in place around the root mass as the plant is lifted from its pot.

The plant support may be constructed of:

a telescoping pole;

a central perimeter size-adjustable base for effectively supporting the telescoping pole;

at least a first detachable ring-like disc detachably attached about the central perimeter size-adjustable base, and at least a second ring-like disc detachably attached about the first ring disc, wherein each of the ring discs is detachable attachable from and to the central perimeter size-adjustable base or the ring-like disc about which it is attached, therein providing for the plant support to effectively support plants potted and repotted in increasingly larger plant pots.

The plant support may be constructed of:

a telescoping pole;

a central perimeter size-adjustable base for effectively supporting the telescoping pole;

at least a first detachable ring-like disc detachably attached about the central perimeter size-adjustable base, and at least a second ring-like disc detachably attached about the first ring disc, wherein each of the ring discs is detachable attachable from and to the central perimeter size-adjustable base or the ring-like disc about which it is attached, therein providing for the plant support to effectively support plants potted and repotted in increasingly smaller plant pots.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF THE REFERENCE CHARACTER AND PARTS TO WHICH THE CHARACTERS REFER

Figure 1:
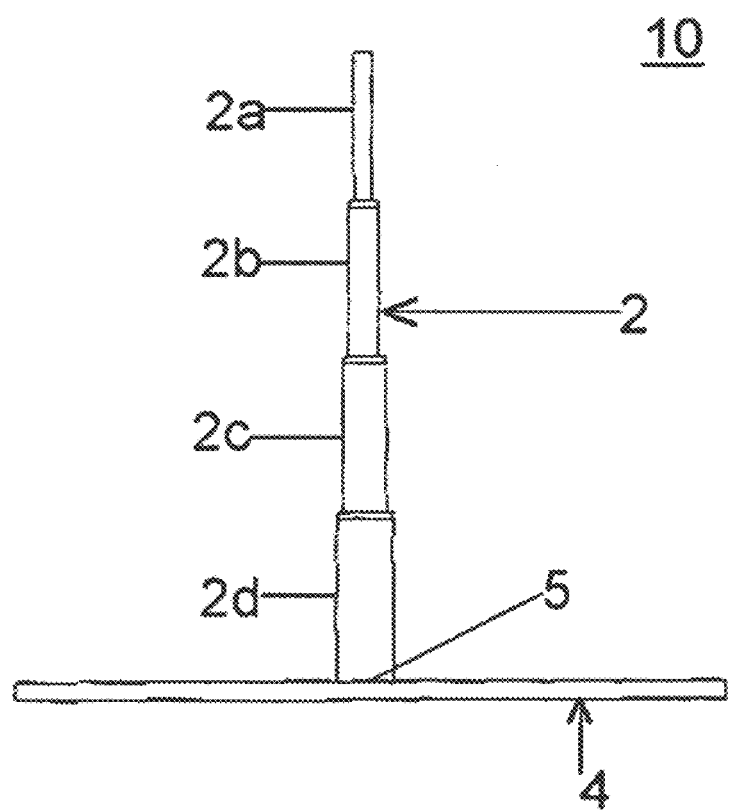
FIG. 1 is an elevation view of a plant support device made following the principles of the present invention.

2 Telescoping plant support pole.
2a A first section of telescoping plant support pole for telescoping into and out of second section of telescoping support pole 2b.
2b A second section of telescoping support pole structured for receiving 2a and for telescoping into and out of a third section of telescoping support pole 2.
2c A third section of telescoping support pole structured for receiving 2b and for telescoping into and out of a forth section of telescoping support pole 2.
2d Fourth section of telescoping support pole having structured for receiving 2c.
4 A perimeter size-adjustable base of plant support with receiving and holding means for supporting telescoping support pole.
4a Central pole-support disc of base 4.
4b A first ring-like disc for placement about 4a.
4c A second ring-like disc for placement about 4b.
5 Receiving aperture in perimeter size-adjustable base 4 for receiving and supporting pole-support 2.
8a Perforated, or similarly treated, separation lines between ring-like discs 4a and 4b.
8b Perforated, or similarly treated, separation lines between ring-like discs 4b and 4c.
10 Telescoping plant support stand with size-adjustable base
12 Ringed perimeter size-adjustable base.
12a Central pole-support disc of base of a preferred embodiment.
12b A first base support attachment ring for detachable attachment to 12a.
12c A second base support attachment ring for detachable attachment to 12b.
14 Detachable attachable connector tabs for connecting attachment rings.
16 Snap attachment means located on central pole-support disc and on attachment rings.
18 A reversibly attachable connector tab.
20 A slit to receive a connector tab 18.
22 Alternate style of perimeter size-adjustable pole support base of plant support with means for receiving and holding telescoping support pole.
22b A first ring for detachable attachment to 22c.
22c A second ring for detachable attachment to 22b.
24 Alternate style 22 of perimeter size-adjustable pole support base of plant stand receiving and holding a first three foot section of telescoping support pole 30.
26 Enlarged alternate style 22 of perimeter size-adjustable pole support base of plant stand receiving and holding a first 60 and a second 62 three foot section of telescoping support pole.
28 A further enlarged alternate style 22 of perimeter size-adjustable pole support base of plant stand receiving and holding a first 60, a second 62, and a third 64 three foot section of telescoping support pole.
30 A plant pot.
32 Telescoping support pole.
40 A young plant.
42 Plant 40 after growing a few feet taller.
44 Plant 42 after growing a few feet taller.
46 A first outer ring.
48 A second outer ring.
50 Threaded aperture for receiving and holding telescoping support pole in the alternately styled support base.
52 End of telescoping pole with threads for inserting into 50.
54 A third outer ring.
56 A fourth outer ring.
58 Alternate style of perimeter size-adjustable pole support base of plant stand receiving and holding a first section 60 of telescoping support pole 32.
60 First foot section of telescoping support pole 32.
62 Second foot section of telescoping support pole 32.
64 Third foot section of telescoping support pole 32.
70 Tabbed attachment means.
80 End of first foot section 60.
82 End of second foot section 62.
84 End of third foot section 64.

It should be understood that the drawings are not necessarily to scale. In certain instances, details which are not necessary for an understanding of the present invention or which render other details difficult to perceive may have been omitted.

DEFINITIONS

Effective amount, as used herein, refers to the amount needed to adequately accomplish a purpose or to produce the intended or expected result. The USPTO discusses "an effective amount" as follows: "The common phrase "an effective amount" may or may not be indefinite. The proper test is whether or not one skilled in the art could determine specific values for the amount based on the disclosure. See In re Mattison, 509 F.2d 563,184 USPQ 484 (CCPA 1975). The phrase "an effective amount . . . for growth stimulation" was held to be definite where the amount was not critical and those skilled in the art would be able to determine from the written disclosure, including the examples, what an effective amount is. In re Halleck, 422 F.2d 911, 164 USPQ 647 (CCPA 1970). The phrase "an effective amount" has been held to be indefinite when the claim fails to state the function which is to be achieved and more than one effect can be implied from the specification or the relevant art. In re Fredericksen 213 F.2d 547, 102 USPQ 35 (CCPA 1954). The more recent cases have tended to accept a limitation such as "an effective amount" as being definite when read in light of the supporting disclosure and in the absence of any prior art which would give rise to uncertainty about the scope of the claim. In Ex parte Skuballa, 12 USPQ2d 1570 (Bd. Pat. App. & Inter. 1989), the Board held that a pharmaceutical composition claim which recited an "effective amount of a compound of claim 1" without stating the function to be achieved was definite, particularly when read in light of the supporting disclosure which provided guidelines as to the intended utilities and how the uses could be effected."

DETAILED DESCRIPTION

Referring now, with more particularity, to the drawings, it should be noted that the principles of the disclosed invention include embodiments in various sizes, shapes, and forms, some of which are described hereinafter. Therefore, the embodiments exhibiting the inventive principles as taught herein are provided with the understanding that the present disclosure is intended as illustrative and is not intended to limit the invention to the embodiments described herein.

An invention encompassing the current inventive principles presents a plant support device having a telescoping pole for supporting growing plants and a size-adjustable base providing support for the pole and for the roots of the plant under certain circumstances. The perimeter of the base of telescoping plant support is size-adjustable providing for use of the plant support device in smaller-sized flower pots or in larger pots. The base of the telescoping plant support comprises a multi-part disc, of any desired shape, that comprises a central base disc support having an aperture for receiving, holding, and supporting the pole part. In addition, there is at least one additional ring-like disc, with an inner diameter sized to fit about the outer diameter of the central base disc. Furthermore, for those embodiments offering a multitude of additional ring-like discs, each of the successively larger ring-like discs are detachably attachable to and from one another and the central ring-like base, providing for the plant support to be used with increasingly larger and smaller plant pots. As an example, a first ring may be affixed to a central base disc by at least one detachably attachable connector tab.

Turning now to the drawings, FIG. 1, an elevation view, illustrates plant support stand 10 comprising several sections of telescoping pole 2 and perimeter size-adjustable base 4. The embodiment illustrated in FIG. 1, telescoping pole 2 is comprised of four sections 2a, 2b, 2c, and 2d which sections are retractable into and releasable from each other providing for desired height adjustment of the support pole 2 to the height of the plant. It is to be understood that although FIG. 1 uses four telescoping sections, the pole may comprise fewer than four telescoping sections or greater than four telescoping sections. One end 2d of telescoping support pole 2 is received by and securely held within aperture 5 situated within size-adjustable base 4. If desired, pole 2 may be securely attached to size-adjustable base 4 using a screw thread on the telescoping pole 2, which is accepted by mating screw threads within the inner cylindrical part of aperture 5. In addition, telescoping pole 2 may simply be supported by size-adjustable base 4 through a friction fit between the inner surface of cylindrical pole receiving aperture 5 and the received end of the support pole. Alternatively, there are many other well known and used means in the art for supporting support pole in support base, which need not be discussed any further here. Plant stand 10 depicted in FIG. 1, is not limited by its material of construction and may be constructed from plastic, wood, or metal, for example.

Figure 2:
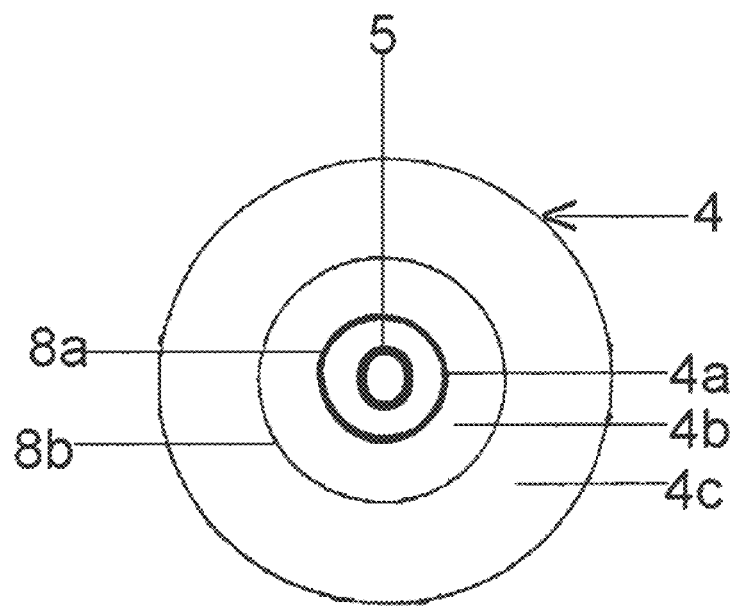
FIG. 2 is a plan view of the plant support stand base, as shown in FIG. 1.

FIG. 2, illustrates a plan view of the plant stand base, as shown in FIG. 1. Size-adjustable base 4 comprises central pole-support perimeter size-adjustable base 4a with pole receiving aperture 5 for receiving pole 2, as illustrated in FIG. 1, ring-like disc 4b, and ring-like disc 4c. It should be noted that, although there are three discs depicted in FIG. 2, the invention may utilize any desired number of discs, where the width (i.e., the radius) of each disc may of vary or be the same. In the present embodiment, central pole-support base disc 4a, ring-like disc 4b, and ring-like disc 4c are received by the consumer seemingly constructed as a single large disc. The rings are visibly differentiate-able by score lines or perforations 8a and 8b imprinted onto a surface of the base disc. In this embodiment, ring-like disc 4c may be separated from ring-like disc 4b and removed making size-adjustable base 4 smaller. If the user requires a plant support with a smaller diameter, ring-like disc 4b may be separated and removed from central pole-support disc 4a. The score lines or perforations provide for easy and rapid separation of ring-like disc 4c from ring-like disc 4b and of separation of ring-like disc 4b from central pole support base 4a. In one favored embodiment, the separated and removed discs cannot be reattached after removed. However, in another favored embodiment, one in which the entire base disc is made thicker, or where each of the discs has a ribbed edge about its outer and/or inner diameter, the sections may be replaced to their original positions and held there by friction adhesion.

Figure 3:
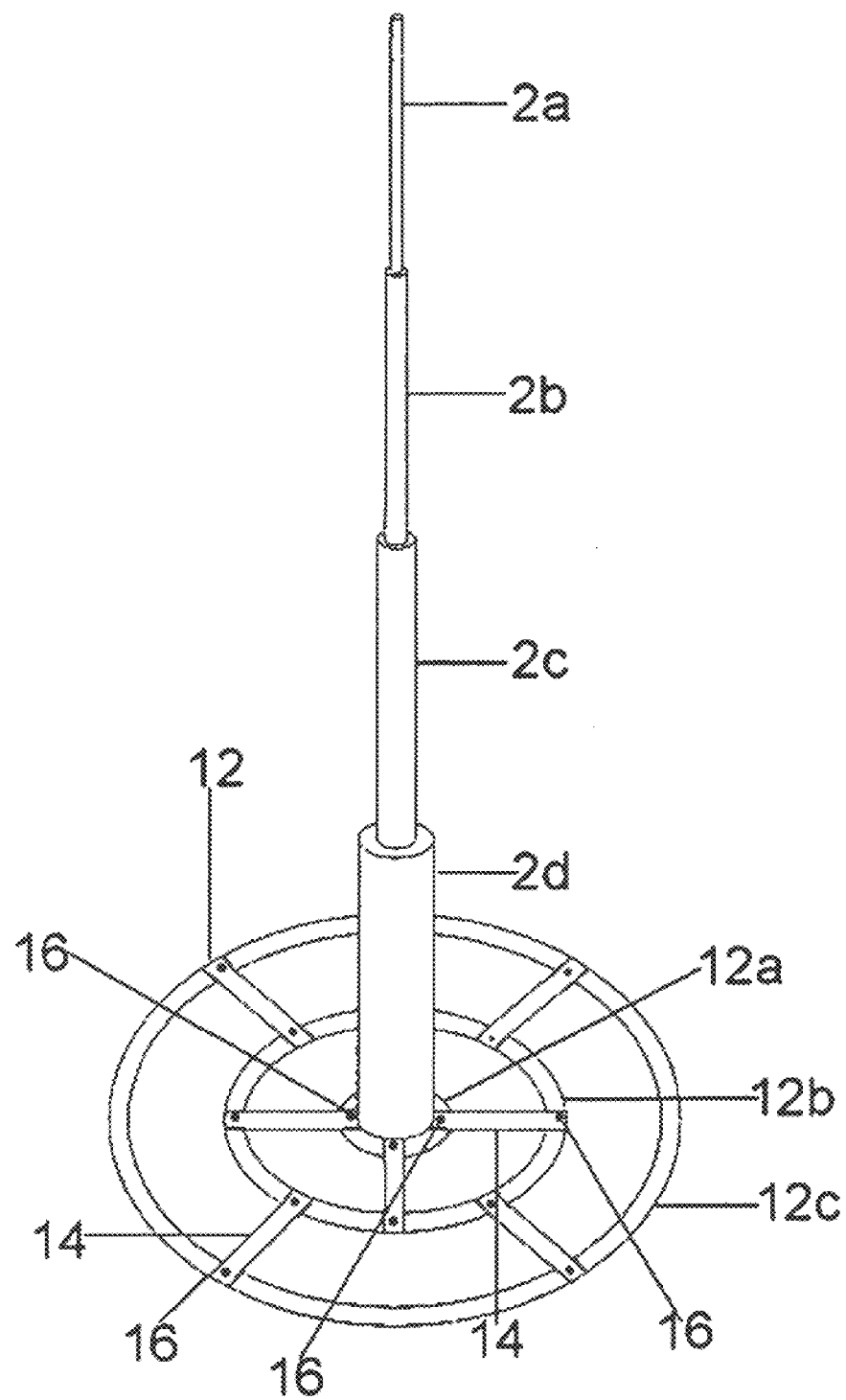
FIG. 3 is a perspective view of an alternate design for the base of the telescoping plant stand.

FIG. 3, a perspective view, illustrates another preferred embodiment of the telescoping plant stand made according to the principles of the present invention. Here is another configuration that may be used to provide for a size-adjustable base. In this embodiment, plant support base 12 may be made larger or smaller, depending on the needs of the user, by detaching and reattaching a series of detachably attachable rings 12a-12c. It is to be understood that in this embodiment, the number of base rings that can be added is as desired. Also, the width of the rings may vary based upon the needs or preferences of the user. If it is to be desired to reduce the amount of material used in the construction of a plant support stand, the width of the base rings is minimized. In this embodiment, central base pole support ring 12a is connected to ring 12b via reversibly attachable connector tabs 14. Snap connectors 16 are provided on each end of connector tabs 14. Mating snap connectors 16 are provided on the surface of each of the rings for receiving the snap connectors on the connector tabs. It should be noted that while the embodiment depicted in FIG. 3 contains four connector tabs between the rings 12a through 12c, there may be as few or as many connector tabs as desired between any of the rings. Such molded snaps have become popular recently, and are commonly found as part of ready to use salad and baked goods products. The use of the snapping connectors allows a user to quickly and easily remove and replace the reversibly attachable connector strips from and to each other providing for a plant support base having a desired size.

Figure 4:
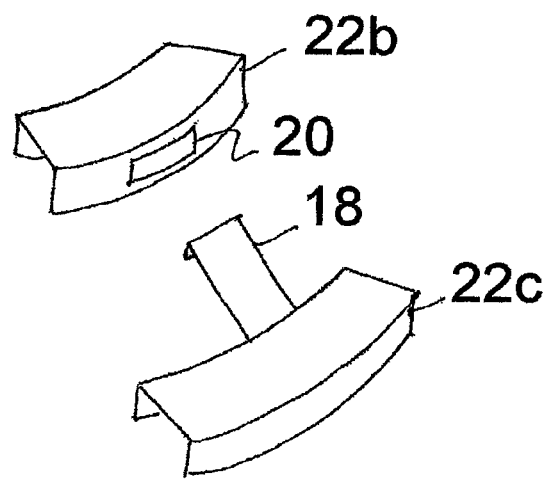
FIG. 4 is a perspective view illustrating a tab/slit connector system for connecting the variously sized rings of the device's base.

FIG. 4 illustrates another ring attachment embodiment that provides for easy and rapid detaching and attaching of each ring-like disc from another, which could be by way of example ring-like disc 22c from ring-like disc 22b. In this embodiment, the telescoping plant support comprises at least one connector tab 18 detachably attachable to central base 22b via at least one slit 20 in each of the rings adapted for receiving an end of an aperture fitting connector tab.

Figure 5A:
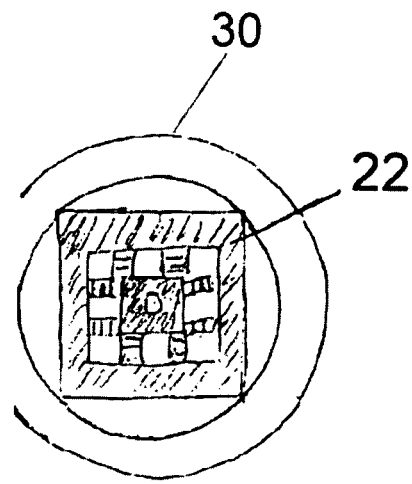
FIGS. 5a, 5b, and 5c are a plan view, a perspective view, and a perspective view, respectively of an alternate design for the base of the telescoping plant stand illustrating how the length of the telescoping plant support pole and the size of the perimeter of the device's base can be adjusted to various sizes of a growing plant.
Figure 5C:
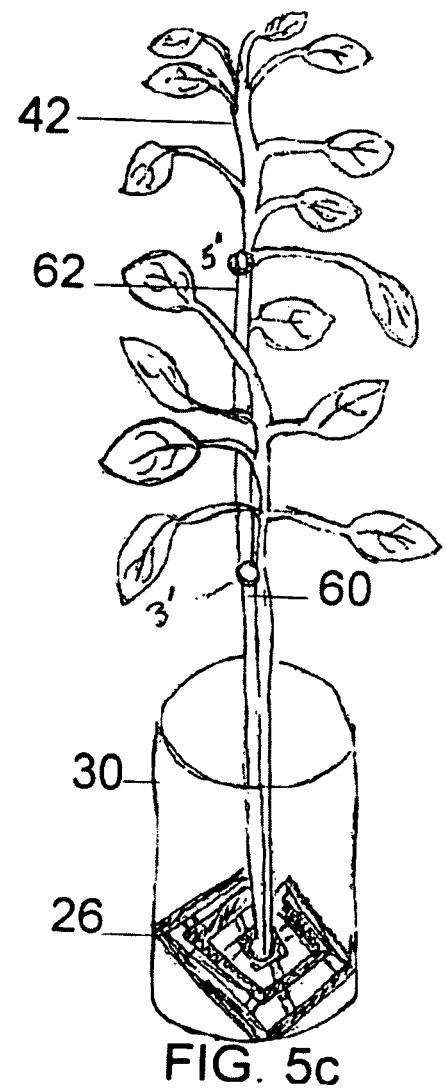
Figure 5B:
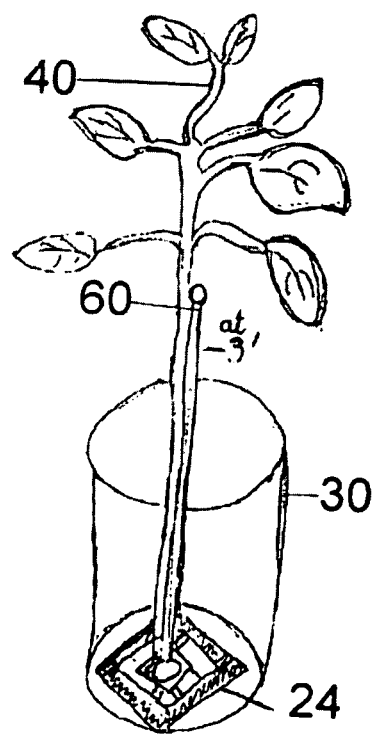

FIGS. 5a-5c provide an illustration of an alternate design for the base of the telescoping plant stand, how the length of the telescoping plant support pole is adjusted to various heights of a growing plant. and how the perimeter size of the device's base can be changed to accommodate various sizes of plants and plant pots. FIG. 5a, a plan view, illustrates square shaped central base section 22 positioned within the base of smaller plant pot 30. FIG. 5b, a perspective view, illustrates square shaped central base section 24 positioned within the base of smaller plant pot 30 to provide support for first section 60 of the pole support and young plant 40. FIG. 5c, another perspective view, illustrates square shaped central base section 26 having an additional ring attached to provide additional support for first section 60 and second section 62 of the telescoping pole support and growing plant 42 positioned within the base of one size larger plant pot 30.

Figure 6:
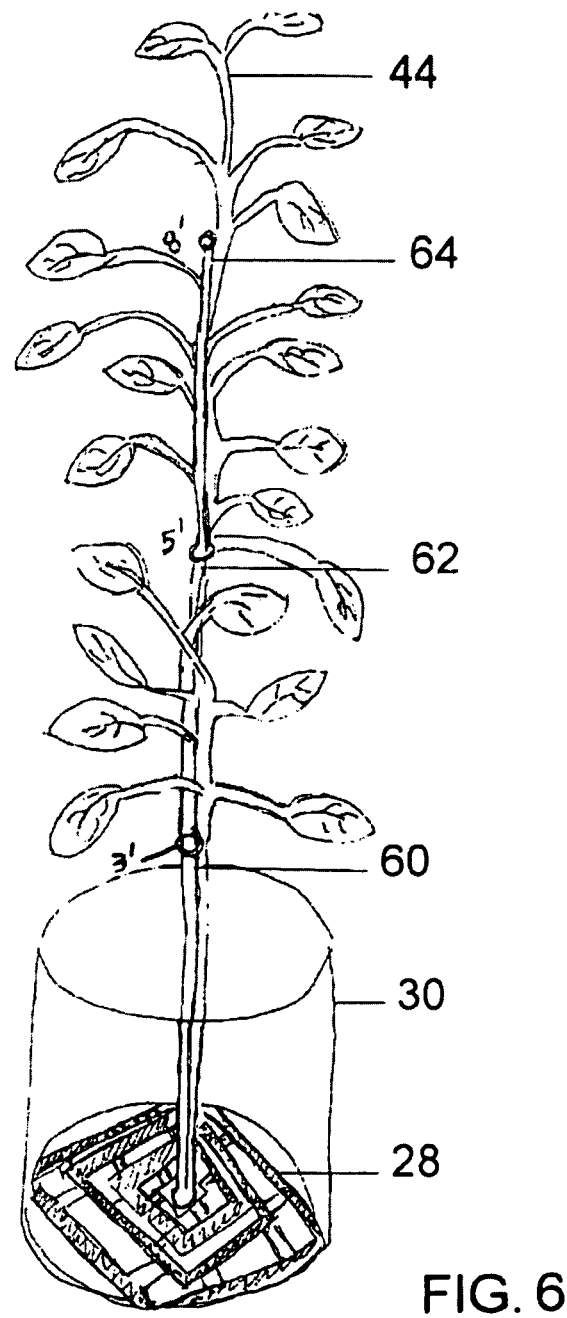
FIG. 6 is a perspective view of the device, as illustrated in FIG. 5, further adjusted to the growing plant.

FIG. 6, a perspective view, yet another perspective view, illustrates square shaped central base section 28 having another additional ring attached to provide additional support for first section 60, second section 62, and third section 64 of the telescoping pole support and ever growing plant 44 positioned within the base of still another size larger plant pot 30. Although pot 30, in this illustration, is expected to have a base of about 17 inches in diameter, the plant support with the addition of the third ring provides support for the pole and for the plant, if and when the plant needs to be lifted from this pot to one another size larger. Regardless of the size of the plant, the pot, and the base, the base supports the root mass and the soil surrounding the root mass so that when the plant is transplanted a goodly amount of the soil stays intact about the root mass reducing both the mess and the stress that is imposed on the plant when it is suddenly removed from the soil and exposed to air and light.

Figure 7:
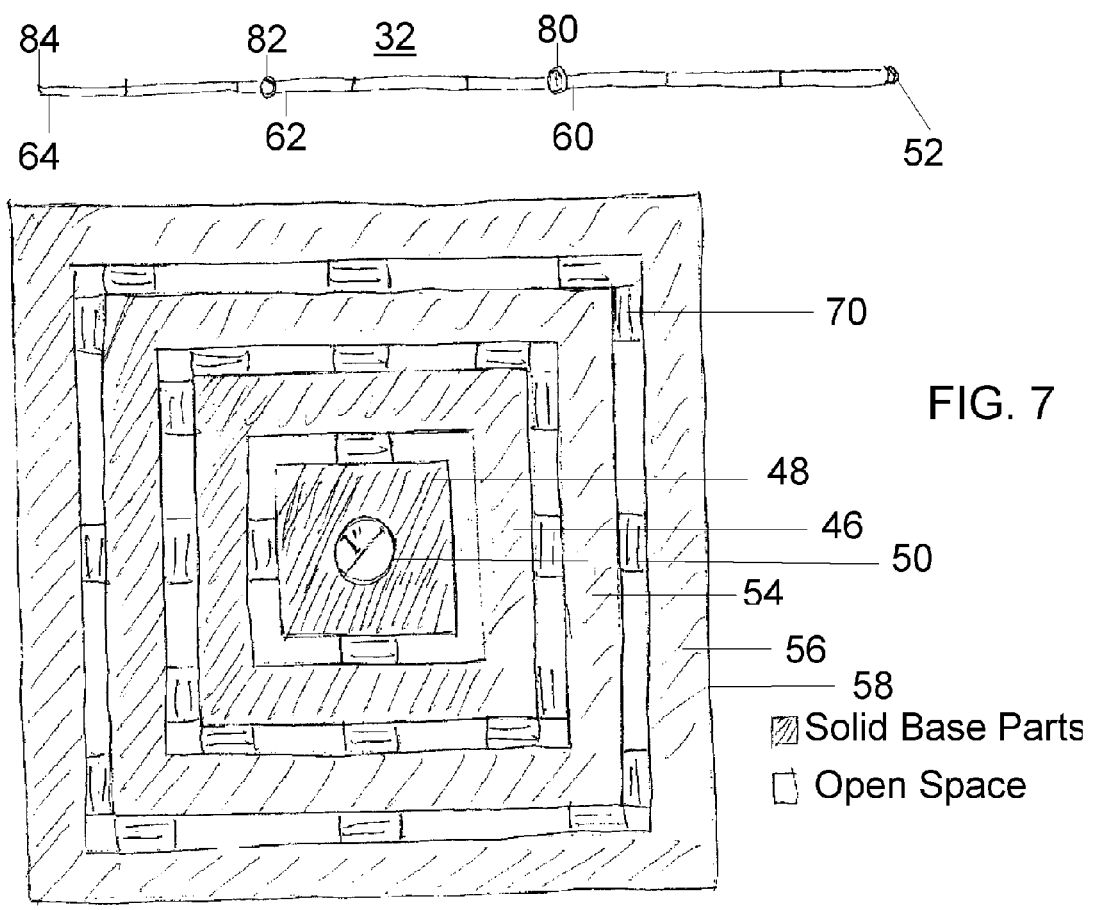
FIG. 7 is a plan view of the support device base with a telescoping plant support pole lying adjacent to the base.

FIG. 7, a plan view, illustrates support device base 20 having rings 56, 54, 46, detachably attached to central base part 48. In this embodiment, the telescoping pole is to be supported in aperture 50, which for example may be structured with threads for accepting the threads on the attaching end 52 of the telescoping plant pole. support lying adjacent to the base. In this example, rings 56, 54, 46 are detachably attached to their adjacent rings and central base part 48 via connectors 70. Lying above base 20 is telescoping pole 32 of three sections, first section 60, second section 62, and third section 64. First section 60 could be inches to feet long and ends at point 80, second section 62, also could be inches to feet long and ends at point 82, and third section 64 also could be inches to feet long and ends at point 84. It is contemplated that the telescoping pole could easily be eight feet in length which would support a plant of even greater height. Base 20 is contemplated to fit pots with base diameters as small as about four inches and as wide as about 24 inches or greater.

Thus, it has been shown above that the principles of the present invention provide a plant support device that will effectively provide the amount of support needed to adequately support a plant during most, if not all of its growing years and will also support the root mass and the soil surrounding the root mass when the plant is being transplanted to reduce the amount of stress suffered by the plant. The device is reusable and provides for supporting plants in larger and smaller pots.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A plant support with an adjustable base, comprising:
a support for plants having:
a telescoping pole extensible or compressible by the sliding of its overlapping sections to between about 2-8 feet in height, and
a perimeter size-adjustable planar base, said perimeter having a diameter increasable or decreasable between about 4 to 24 inches for use in pots of from 4 to 24 inches diameter,
said base providing support for said telescoping pole;
said perimeter size-adjustable base having
a central section
a first ring section positionable about said central section, and
at least a second ring section positionable about said first ring,
wherein each of said ring sections is repeatedly releasably attachable from and to the central section or the ring section about which it is to be positioned using snapable connectors, therein providing for the plant support to effectively support plants potted and repotted in increasingly smaller or larger plant pots.

* * * * *